United States Patent [19]

Medin

[11] Patent Number: 5,442,669
[45] Date of Patent: Aug. 15, 1995

[54] PERISHABLE GOOD INTEGRITY INDICATOR

[76] Inventor: David L. Medin, 940 Saint Joseph Ave., Los Altos, Calif. 94024

[21] Appl. No.: 175,209

[22] Filed: Dec. 27, 1993

[51] Int. Cl.⁶ .................................... H03K 4/00
[52] U.S. Cl. .................................. 377/20; 377/25; 327/141
[58] Field of Search ............... 377/20, 25; 307/269; 327/141

[56] References Cited

U.S. PATENT DOCUMENTS

| | | | |
|---|---|---|---|
| 4,150,573 | 4/1979 | Iinuma et al. | 377/25 |
| 4,385,230 | 5/1983 | Danielsen | 377/25 |
| 4,644,481 | 2/1987 | Wada | 377/25 |
| 4,658,407 | 4/1987 | Iwama | 377/25 |
| 5,323,436 | 6/1994 | Lee | 377/20 |

Primary Examiner—Margaret Rose Wambach
Attorney, Agent, or Firm—Stroock & Stroock & Lavan

[57] ABSTRACT

A perishable good integrity indicator includes a first oscillator for outputting a first clock signal which does not substantially vary in response to temperature. A second oscillator outputs a second clock temperature which varies as a function of temperature. A counter counts the pulses of the second clock signal during a time period determined by the first clock and outputs a count value. A data table receives the count value, translates the count value into a time temperature value representing the relationship of time and temperature during the time period and outputs the time temperature value to an adder. The adder adds the time temperature values output by the data table over time and outputs a cumulative time temperature value corresponding to shelf life for a product.

23 Claims, 6 Drawing Sheets

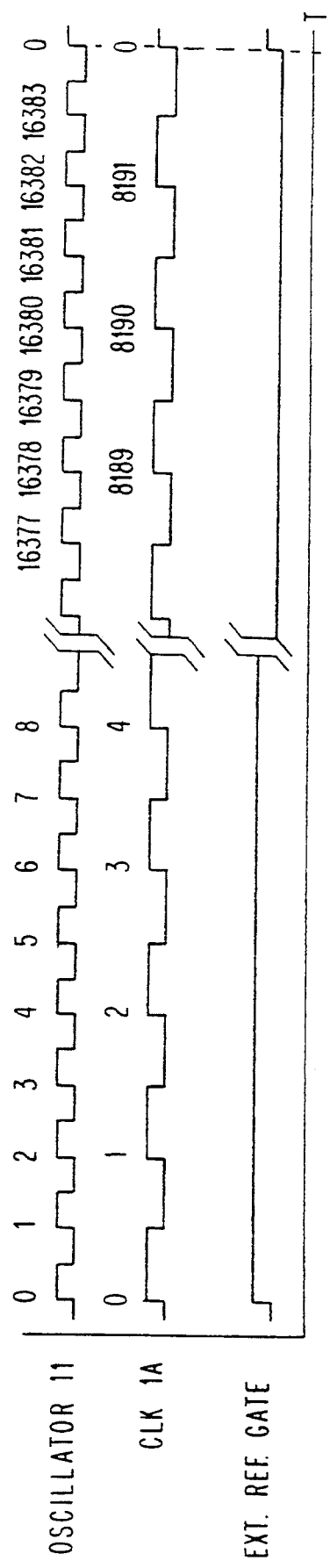
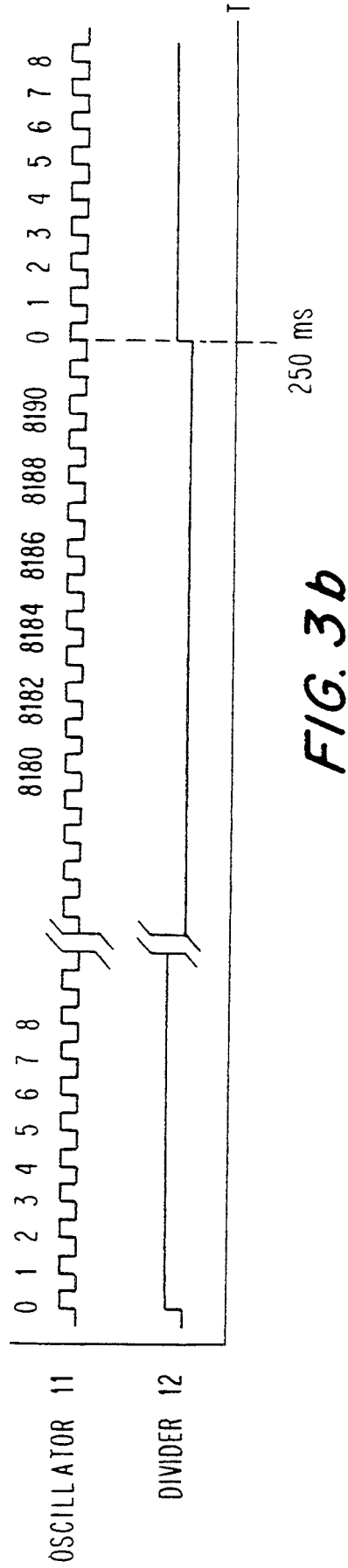

PERISHABLE GOOD INTEGRITY INDICATOR

BACKGROUND OF THE INVENTION

This invention is directed to a perishable good integrity indicator, and more particularly to an apparatus for accurately determining the shelf life of a perishable good.

Perishable goods such as foods, medications and the like lose their potency and/or their nutritional value over time when exposed to temperature. The time period during which perishable goods maintain their nutritional value and/or potency is known as the shelf life. Once the shelf life has expired, the perishable good may be of no further value and in many cases, may actually be harmful if utilized as in the case of spoiled food.

A perishable good will have a given shelf life at a given temperature. As the temperature increases, the shelf life normally decreases, and the shelf life normally decreases at some exponential rate. The shelf life and integrity of different goods varies as a function of optimum storage temperature, the length of time the product will last at the optimum temperature, the deterioration curve of the product due to increased heat, and the affect on shelf life and product integrity due to decreased heat or severe cold.

In the prior art, shelf life is determined in advance for each individual product based upon empirical data and based upon assumed conditions during storage. An expiration date based upon this estimated shelf life is then stamped on the product and as a rule, these perishable goods are not sold after the expiration date. This system has been satisfactory, however it suffers from the disadvantage that the shelf life determination does not accurately reflect the actual conditions to which the perishable good is subjected, such as the temperature at which the good is stored in individual stores. Accordingly, products which have been stored in excessive hot or cold conditions are maintained on shelves well beyond the expiration of their shelf life and products which are optimally stored are often removed in accordance with the stamped date prior to the expiration of their actual shelf life.

Shelf life is a function of time and temperature. Devices for measuring time and temperature deviation are known in the art and use oscillation circuits which vary output frequency with temperature deviation. Analog compensation circuits are utilized to increase or decrease the amount of frequency variation at a given temperature range and the frequency deviation is measured as an estimated temperature deviation. These electronic temperature measuring devices are satisfactory, however they suffer from the disadvantage that it is prohibitively expensive to accurately build oscillators with temperature consistent characteristics utilizing standard manufacturing processes. Accordingly, a frequency calibration circuit must be incorporated to compensate for manufacturing variations. This calibration requires time and special equipment which increases the cost of the product by requiring that the circuit include a calibration interface and possibly significant non-volatile memory. Additionally, the temperature variation of the oscillator with respect to frequency is subject to numerous factors making it difficult to achieve the correct temperature to frequency correlation curve for a desired time temperature application. Additionally, different perishable goods have different shelf life parameters making the prior art oscillator based time temperature indicators impractical and/or inaccurate.

Accordingly, a time temperature measuring device capable of indicating a product shelf life which overcomes the shortcomings of the prior art is desired.

SUMMARY OF THE INVENTION

Generally speaking, in accordance with the present invention a perishable good integrity indicator includes a first oscillator which outputs a clock which does not vary frequency with temperature. A self calibration circuit receives the clock output from the first oscillator and calibrates the output with respect to a known stable clock source. A second oscillator outputs a clock which varies frequency with temperature. A second self calibration circuit calibrates the second oscillator clock over temperature. A counter receives the calibrated clock from the second oscillator. The counter counts the calibrated clock signal from the second oscillator for a time period determined by the calibrated output of the first oscillator. A data table receives the count number from the counter and outputs a spoilage value in response thereto for the product in question. An adder receives this spoilage value and computes a cumulative spoilage value by adding the previous inputs from the data table. An LCD modulator receives the cumulative value and modulates the LCD to display data indicative of the remaining shelf life of the products.

In another embodiment of the invention, the adder is replaced with a dual counter. The first counter of the dual counter counts the self calibrated clock signal from the temperature compensated oscillator. The first counter counts up to a predetermined number and holds that number until it is reset. The first counter also receives a reset input. The first counter is reset in response to a second signal received from the calibrated temperature compensated oscillator. The data table receives information from the first counter and outputs data corresponding to a starting point for the first counter to begin counting from. The second counter of the dual counter counts the number of times the first counter counts to the predetermined number and provides an output to the LCD modulator so that the LCD modulator can modulate an LCD to indicate the remaining shelf life.

The self calibration circuit for calibrating the first oscillator over time includes a divider for receiving the clock signal of the temperature compensated oscillator. A counter receives a clock signal from the divider and an enable signal for a temperature compensated reference gate. The temperature compensated reference gate enables the counter for a known time period. At the end of the enablement time period the counter provides a latched count to the divider in a feedback loop. The divider divides the clock frequency of the temperature compensated oscillator by the latched number to provide a second clock output utilized by the remainder of the circuit. The counter is a one time enable counter so that the reference gate may be removed once the enablement period has ended.

The self calibration circuit for calibrating the second oscillator over temperature also includes a divider which divides the oscillator clock and provides a first clock signal. A counter receives the first clock signal and receives an enablement input from a reference gate compensated by temperature and counts clock signals for a predetermined time period. Once the enablement period has ended, a latched count is input back to the divider and the oscillator frequency is divided by this latched number to produce a second clock. This second clock is input to the counter.

Accordingly, it is an object of the invention to provide an improved perishable good integrity indicator.

Yet another object of the invention is to provide an automatic calibration circuit for an oscillation circuit.

Still another object of the invention is to provide a circuit for calibration of an oscillator at different temperatures.

Yet another object of the invention is to provide an accurate time/temperature indicator utilizing inexpensive, non-crystal controlled oscillators as a reference oscillator.

A further feature of the invention is to provide circuitry for calibration and recalibration of an oscillator which requires minimal time and without the use of interface circuitry or significant nonvolatile memories.

Still another object of the invention is to provide historical time temperature measurement at a reduced cost and size.

Yet another object of the invention is to provide an apparatus for measuring historical time temperature relationships utilizing non-contiguous weighing of time temperature data.

A further object of the invention is to provide an apparatus for measuring historical time temperature relationships and displaying a remaining product shelf life, integrity and/or a product spoilage index at any point in time.

Yet another object of the invention is to provide an apparatus for measuring historical time temperature in which either a single pixel or a multiple pixel indicator can be used as a display shelf life gauge to indicate the desired life expectancy of a product.

Another object of the invention is to provide an apparatus which measures historical time temperature utilizing an accurate time calibration circuit.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description, taken in connection with the accompanying drawings, in which:

FIGS. 3a–3d are timing diagrams for the temperature compensated oscillator, reference gate, and divider utilized in two embodiments of the invention.

DESCRIPTION OF THE PREFERRED EMBODIMENT

Figure 1:
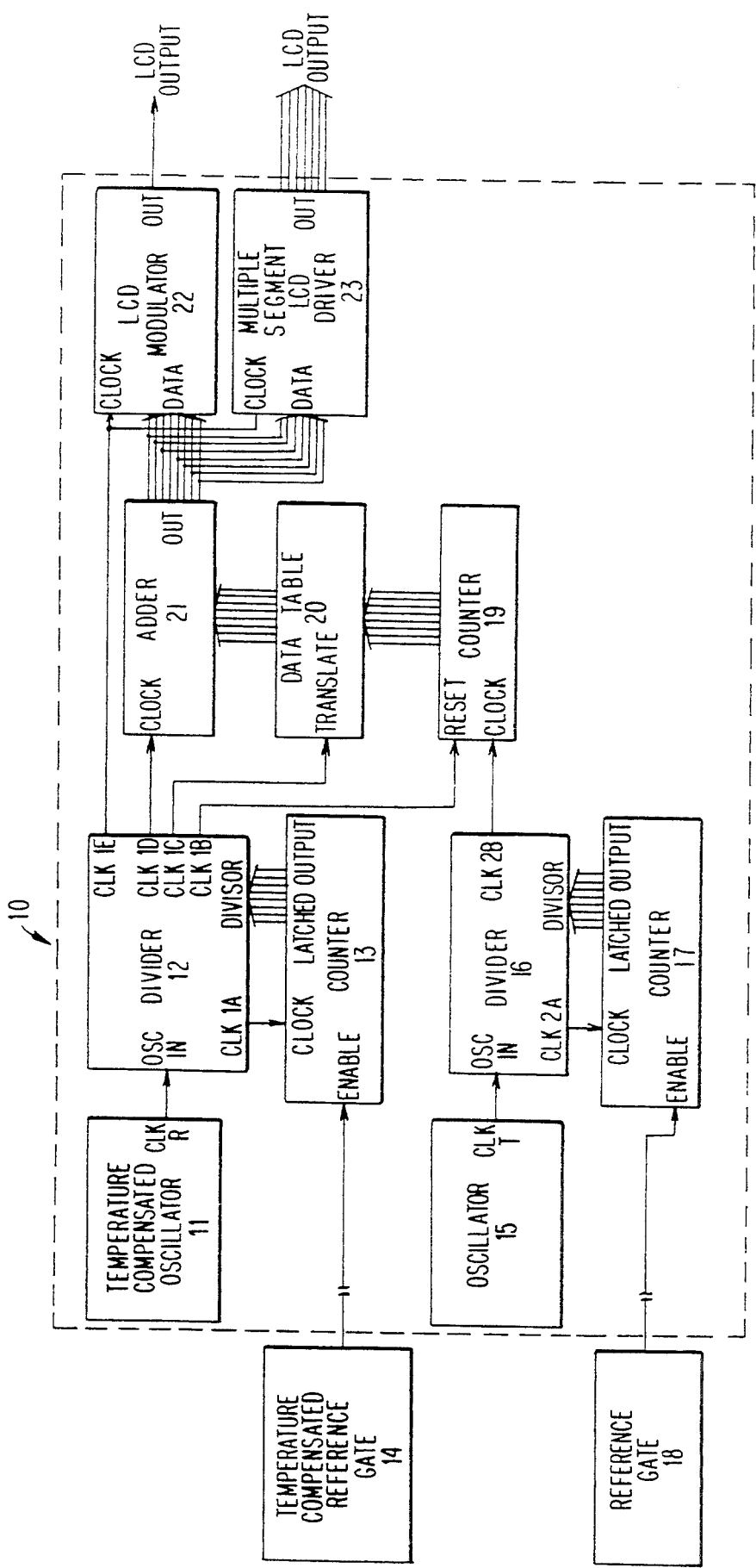
FIG. 1 is a block diagram of a perishable good integrity indicator constructed in accordance with the invention.

Reference is made to FIGS. 1, 3a and 3b wherein a perishable good integrity indicator, generally indicated as 10, is shown. A temperature compensated oscillator 11 outputs a reference clock CLK R to divider 12. Divider 12 divides CLOCK R and outputs the CLK 1A. A counter 13 receives CLK 1A as a clock input. A temperature compensated reference gate 14 provides an enable signal to counter 13 causing counter 13 to count CLK 1A for a predetermined time period. Counter 13 is a one time enable counter. At the end of the enable time, the count is output as a latched output to divider 12 which utilizes the latched output as a divisor to produce clock signals CLK 1B, CLK 1C, CLK 1D, CLK 1E.

A second oscillator 15 outputs a reference signal CLK T which varies with temperature. Divider 16 receives signal CLK T, divides the signal and outputs a CLK 2A. A counter 17 receives an enable signal from a reference gate 18 which is compensated for ambient temperature and receives CLK 2A as the input. Counter 17 counts signal CLK 2A during the enable time period and latches the count number. Counter 17 is also a one time enable counter and outputs the latched count number to divider 16 which utilizes the latch count to provide a clock signal CLK 2B.

A counter 19 receives signal CLK 2B and counts the clock. Counter 19 resets the count in response to CLK 1B produced by divider 12 and outputs the count value. A data table 20 containing a data table corresponding to a relationship between a count value from counter 19 and the amount of spoilage experienced by an associated good outputs the spoilage value in response to the output from counter 19. In one embodiment, the count output from counter 19 may correspond to a memory address at which address, a spoilage value is stored. In another embodiment, data table 20 may be considered as storing a curve in which one axis has count values while a second axis presents spoilage values and the count value addresses a position on the spoilage curve. In response to a clock signal CLK 1C produced by divider 12, data table 20 outputs the spoilage value to an adder 21. Adder 21 sums the outputs from data table 20 to derive a cumulative spoilage value. In response to a clock signal CLK 1D produced by divider 12, adder 21 outputs data corresponding to the accumulated spoilage value.

An LCD modulator 22 receives this data. In response to a clock signal CLK 1E provides an output in response to the data to modulate an LCD (not shown). The LCD is one that is well known in the art. Simultaneously, a multiple segment LCD driver 23 receives the same clock and data signals and provides an LCD output to the LCD.

During operation of an exemplary embodiment, the temperature compensated oscillator 11 outputs a signal CLK R having a frequency of 32768 Hz. Divider 12 is a divide by 2 divider and creates signal CLK 1A having a frequency of 16384 Hz. Temperature compensated reference gate 14 enables counter 13 for 500 milliseconds. Counter 13 records the number of counts of CLK 1A during the external reference gate. The latched output is 8192 corresponding to the number of counts of the clock CLK 1A counted during 500 milliseconds. The number 8192 is output as the latched output to divider 12. Divider 12 utilizes the count as a divisor. Signal CLK R is divided by 8192 yielding a 4 Hz internal reference clock which is output as clock signals CLK 1B, CLK 1C, CLK 1D and CLK 1E. (FIG. 3b) Because counter 13 is a one time enable counter, temperature compensated reference gate 14 may be removed once counter 13 has been enabled and divider 12 will maintain an output of a 4 Hz signal.

Figure 3C:
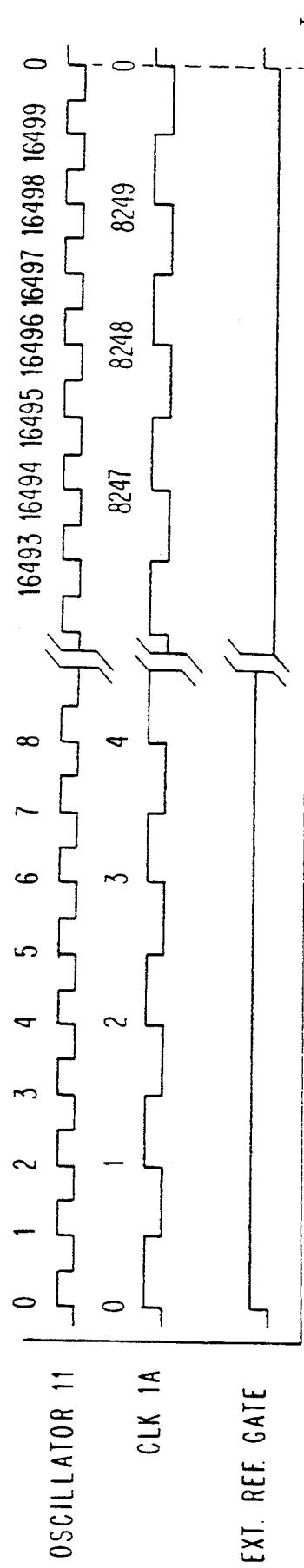
Figure 3D:
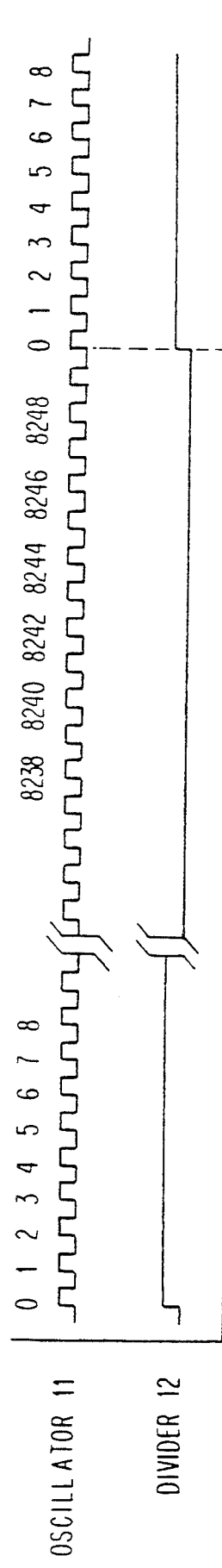

In a second example shown in FIGS. 3c and 3d, temperature compensated oscillator 11 outputs a signal CLK R of 33000 Hz. Divider 12 divides the signal by 2 outputting clock signal CLK 1A of 16500 Hz. The latched output of counter 13 will be 8250. Once the external reference gate 14 is removed, divider 12 will always divide the 3300 Hz signal CLK R by 8250 in response to the latched output of counter 13 again yielding a 4 Hz internal reference clock for divider 12. As temperature compensated elements, oscillator 11 and reference gate 14, do not substantially vary their outputs with respect to changes in temperature.

By design, both examples provide a 4 Hz internal reference clock for divider 12. Divider 12, counter 13 and temperature compensated reference gate 14 provide a self calibration circuit which calibrates the frequency relative to time to normalize the output of an inexpensive oscillator 11 without the need for manual intervention. Divider 12 divides the 4 Hz internal reference clock and shift the signals creating CLK 1B, CLK 1C, CLK 1D and CLK 1E at 0.03125 Hz intervals, or one cycle of each clock occurring each 32 seconds.

Figure 4A:
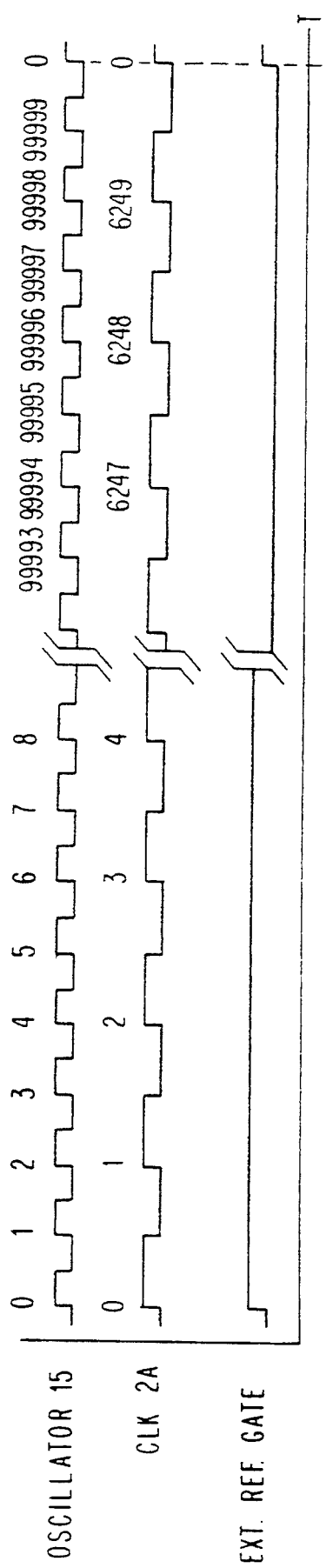
FIGS. 4a–4d are timing diagrams for the oscillator, reference gate and divider having outputs which vary in response to temperature in one embodiment of the invention.
Figure 4B:
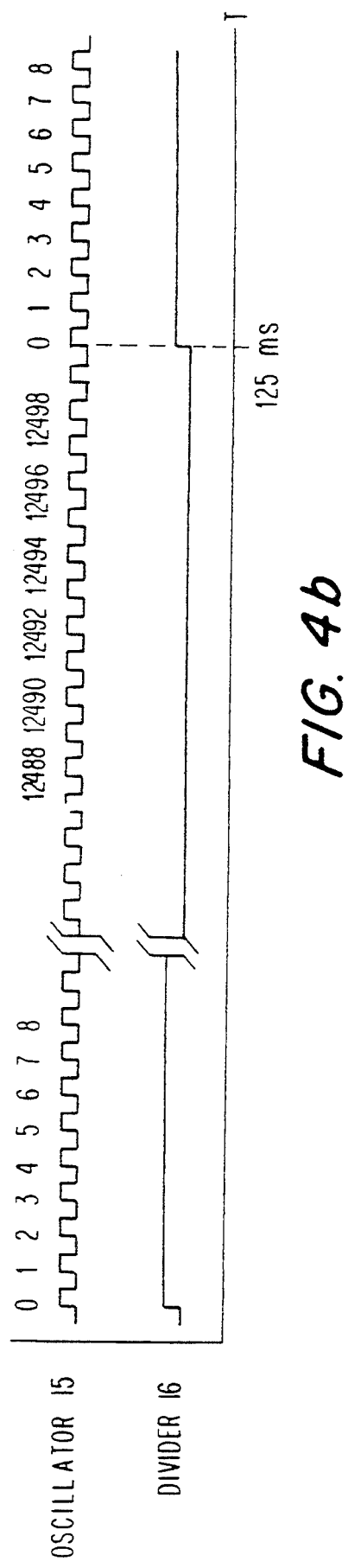
Figure 4C:
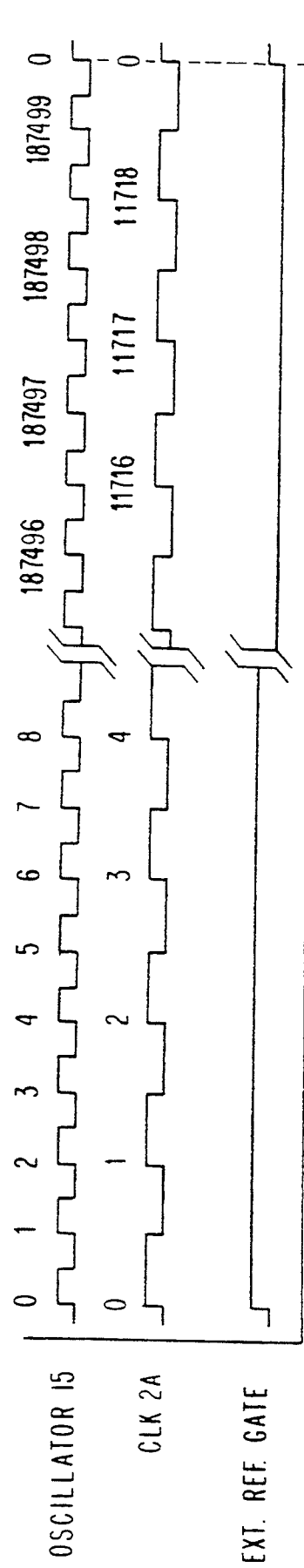

As shown in FIGS. 4a-4d, oscillator 15 is designed to vary its clock output with temperature. By way of example, oscillator 15 provides a reference frequency clock CLK T of 300 kHz at 22° C. (FIG. 4a). Divider 16 divides CLK T by 16 providing a clock signal CLK 2A of 18750 Hz. Reference gate 18 which is compensated for ambient temperature (not temperature compensated) also changes its output with temperature to calibrate the frequency output of oscillator 15. At 22° C., reference gate 18 enables counter 17 for 500 milliseconds, during which counter 17 records the number of clock pulses of clock signal CLK 2A and latches that count to provide a latched output to divider 16. At 22° C., the latched output will be 9375. Reference gate 18 may then be removed and divider 16 will always divide clock signal CLK T by 9375 to produce a 32 Hz clock output as CLK 2B at 22° C.

In another example, oscillator 15 operates at 200 kHz at 22° C. so that clock signal CLK 2A has a frequency of 12500 Hz. The latched output of counter 17 is 6250 Hz. Again, because counter 17 is a one time enable counter which latches a count in response to an enable input, reference gate 18 may be removed, and counter 17 will always output the 6250 value and divide the 200 kHz CLK T signal by 6250 to output a 32 Hz output for clock signal CLK 2B at 22° C.

Figure 4D:
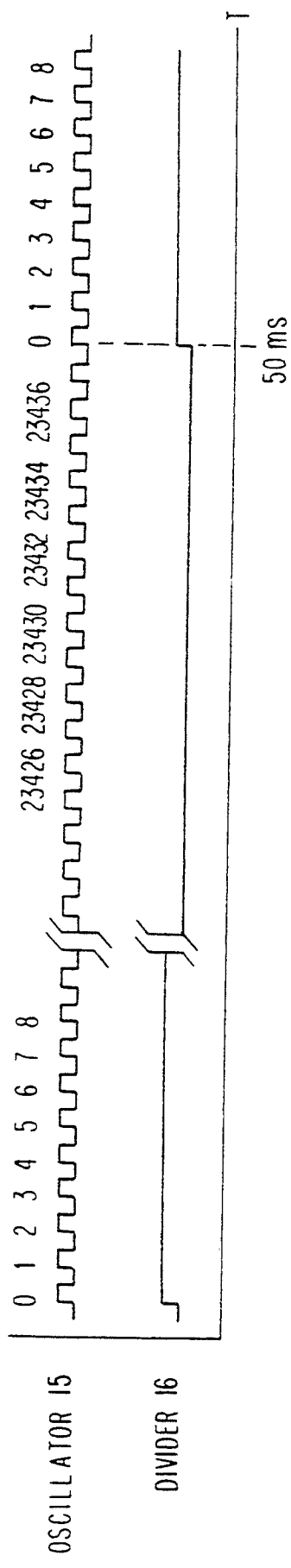

If the temperature changes, to 30° C. by way of example, oscillator 15 would output a 375 kHz CLK T clock signal. Divider 16 divides the signal by 16 and outputs a clock signal CLK 2A having a value of 23437 Hz (FIG. 4d). Because reference gate 18 also adjusts its output in response to temperature, reference gate 18 outputs an enable signal for 400 milliseconds (FIG. 4c) due to the higher ambient temperature. Counter 17 counts 9375 pulses and latches this number as the output to be used as the divider in divider 16. Divider 16 divides the 375 kHz CLK T signal by 9375 yielding an internal clock of 40 Hz so that clock signal CLK 2B is 40 Hz at 30° C. and 32 Hz at 22° C. Clock signal CLK 2B has been characterized to operate at roughly 4/3 the frequency at 30° C. as it does at 22° C.

Divider 16, counter 17 and reference gate 18 are considered to form a calibration means for calibrating clock signal CLK T outputted by oscillator 15. As a result, the design normalizes the output of a temperature dependent oscillator without manual intervention.

Counter 19 receives a clock input from clock signal CLK 2B and a reset signal CLK 1B from divider 12. Signal CLK 1B is a calibrated, temperature independent, time window occurring once every 32 seconds. Clock signal CLK 2B is a calibrated, temperature dependent, frequency operating at 32 cycles per second at 22° C. Counter 19 counts the pulses of signal CLK 2B during the time window created by signal CLK 1B. Using the example where oscillator 15 operates at 300 kHz at 22° C. and 400 kHz at 30° C., counter 19 will count to 1024 at 22° C. (counting a 32 Hz signal for 32 seconds) and 1280 at 30° C. (counting a 40 Hz signal for 32 seconds). Because these counts gain in response to temperature, these counts constitute a temperature measurement.

Data table 20 includes a data table which receives the counts from counter 19 and converts those counts to product specific, shelf life/spoilage data. For example, for use in conjunction with drugs, data table 20 would receive count input 1024, translate this value into a spoilage value of 28 output to adder 21. The data table input of 1280 translate to an output of 44. On the other hand, a product such as cheese would have a data table 20 programmed so that the input of 1024 would result in data table 20 outputting a spoilage value of 153 and an input of 1280 would cause data table to output a value of 337 to adder 21 representing a shorter shelf life in response to temperature. Data table 20 only provides an output in response to clock signal CLK 1C which triggers this translation function of data table 20. This trigger occurs once every 32 seconds.

Adder 21 sums the outputs from data table 20. The new output from data table 20 is added to the previous outputs of data table 20 every time clock CLK 1D is strobed. The resultant sum of adder 21 represents time temperature data current as to the last strobe signal. It provides an indication of how far the associated product is along the spoilage curve. In response to clock signal CLK 1D, adder 21 outputs this information as data to LCD modulator 22 and multiple segment LCD driver 23.

LCD modulator 22 modulates the LCD display in response to the data output by adder 21. LCD modulator 22 may be a frequency modulator, a phase modulator, a duty cycle modulator or the like. When the LCD is modulated, the LCD exhibits flicker. This flicker is detectable by the human eye up to about 60 Hz. The flicker is machine readable up to about 200 Hz. In one embodiment of the invention, it is contemplated that the LCD would be a shuttered LCD so that it is opaque when modulated at less than 60 Hz and would be clear when modulated above 60 Hz. A red dot is placed behind the LCD. The LCD modulator 22 would modulate the LCD at higher frequencies in response to higher sums output by adder 21. An observer would not see the red dot at the lower frequencies, but would see a red dot once LCD modulator 22 modulated the LCD at a rate greater than 60 Hz. If LCD modulator 22 is calibrated not to exceed a modulation of 60 Hz until the value provided by adder 21 corresponds to a spoilage value, then the appearance of the red dot would indicate to a customer or store owner that the shelf life of the product has expired.

In another embodiment of the invention, mirrors may be placed behind the LCD. A reader containing a light source such as an LED and a light sensor, would shine the light at the LCD. Because the LCD is exhibiting flicker, the return light signal from the mirror behind the LCD, will flicker. The light sensor determines the amount of flicker and determines how far along in the shelf life the product was by the rate of flicker. By the same token, by modulating the duty cycle of the LCD, the returning light signal may be encoded with data by controlling the duty cycle of the LCD as it causes flicker within the modulated duty cycle within the returning light beam. As a result, the LCD modulator coupled with a shuttered LCD is capable of outputting complex data in response to data table 20.

Either simultaneously with, or in place of the use of the shuttered LCD, a multiple segment LCD driver 23 is coupled to a second LCD which is driven to illuminate the sequential LCD shutters or segments of a standard character display. Accordingly, as segments of the LCD are illuminated or converted from closed to open (in the case of a shuttered LCD), a gas gauge type of display indicating the current shelf life status as a function of increasing count adder values, of the product is provided.

It is noted, that the shelf life of many products is measured in months, whereas the oscillators, dividers and counters of the above described invention operate in thousands and hundred of thousands of cycles per second. The use of divider 12 to strobe counter 19, data table 20, adder 21, LCD modulator 22 and multiple segment LCD driver 23 provides a built in delaying effect so that the data is not necessarily updated every second, but is updated once every few minutes during the period in which divider 12 proceeds through all of signal CLKs 1B–1E which are spaced at 32 second intervals. However, this is in no means limiting and each of the components may be instantaneously strobed to provide updates at the LCD at the rate of the oscillator clocks, if desired.

Figure 2:
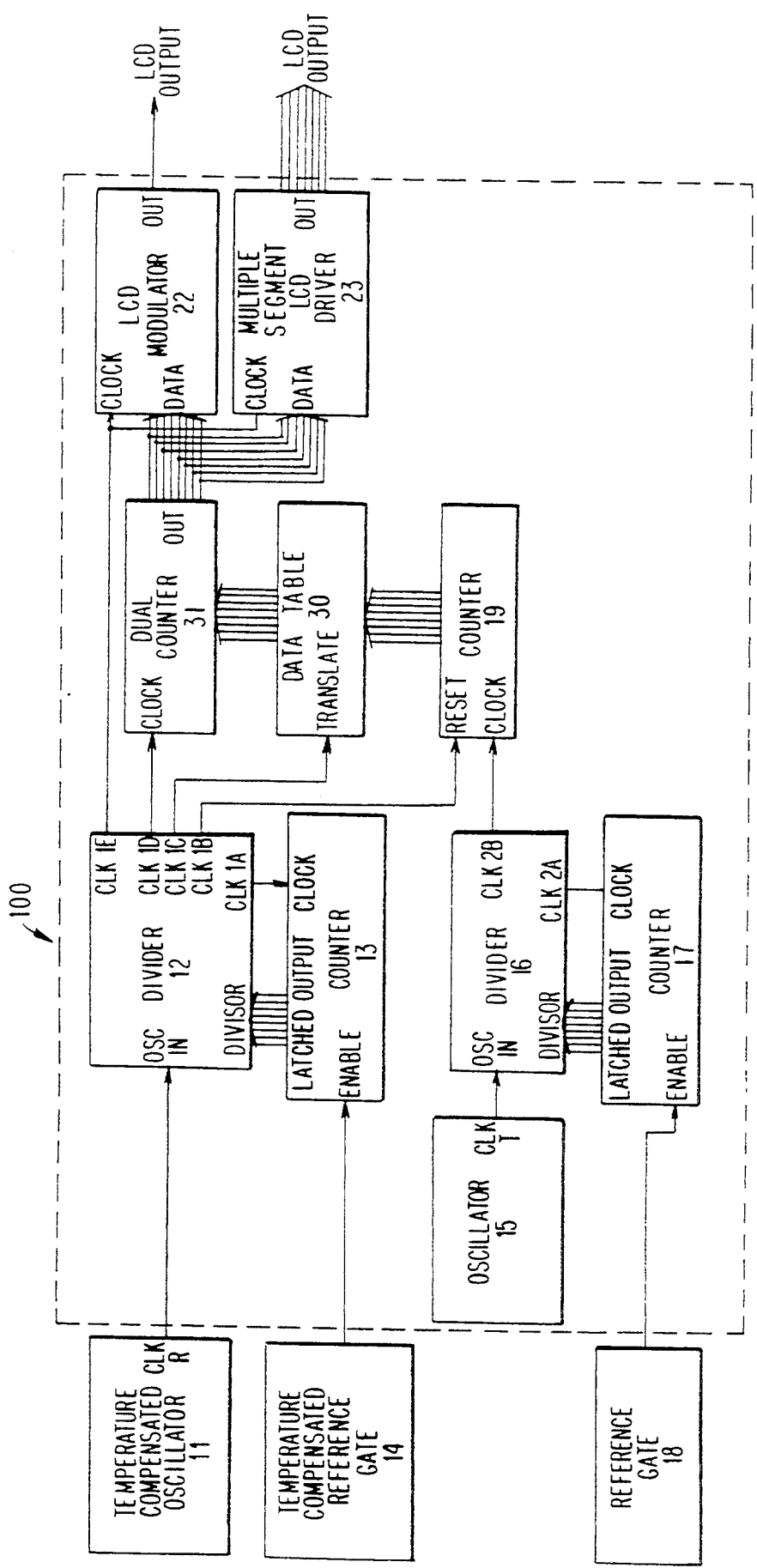
FIG. 2 is a block diagram of a perishable good integrity indicator constructed in accordance with a second embodiment of the invention.

Reference is now made to FIG. 2 wherein a perishable good integrity indicator constructed in accordance with the second embodiment of the invention is provided. Like numbers are utilized to indicate like structures, the difference between indicator 100 and indicator 10 being the replacement of a dual counter 51 for adder 21, and a change in the operation of data table 20 necessitating the addition of a clock signal CLK 1F produced by divider 12.

As in indicator 10, temperature compensated oscillator 11 outputs a clock CLK R to divider 12 which divides the signal in response to the latched output of counter 13 which is latched in response to temperature compensated reference gate 14. Divider 12 produces a normalized internal signal of 4 Hz. Similarly, oscillator 15 outputs a clock CLK T which varies with temperature. Divider 16 divides the signal in response to the latched output of counter 17 which is latched in response to reference gate 18 which varies its output in response to temperature. Divider 16 outputs a clock signal CLK 2B which varies with temperature. Counter 19 outputs a count number corresponding to the number of clock pulses of clock CLK 2B during each cycle of clock CLK 1B.

Data table 30 outputs a time temperature value which relates shelf life to the temperature count provided by counter 19.

Dual counter 31 includes a first counter which always counts to a predetermined number. For example, the first counter of dual counter 31 counts the clocks supplied by clock signal CLK 1D until it reaches a value of 512. The second counter of dual counter 31 counts the completion of a cycle performed by the first counter of dual-counter 31. Accordingly, each time the first counter counts to 512, the second counter increments its count by 1.

The first counter of dual counter 31 also counts in response to the load output by data table 30. The first counter does not begin each cycle counting from 0. Rather, the counter begins its count within each cycle at a number selected by data table 30. Referring to our previous example, in connection with indicator 10, if counter 19 outputs a value of 512, data table 30 would translate this input to an output of 28. Accordingly, the first counter in dual counter 31 would count from 28 to 512. As a result, dual counter 31 is only counting 494 pulses of clock signal CLK 1D. When the first counter of dual counter reaches a value of 512, the second counter of dual counter 31 is incremented by 1. The first counter is reset to the number selected by data table 30 in response to the end of the count. The count value of the second counter of dual counter 31 is continuously output to LCD modulator 22 and multiple segment LCD driver 23 as data.

When a change of temperature occurs, the count from counter 19 changes. By way of example, if the count produced by counter 19 should increase to 640, data table 30 may produce an output 44. As a result, the first counter of dual counter 31 begins its count at 44, arriving at the value of 512 more quickly, because the numbers counted are fewer, as a result of the rise in temperature. Accordingly, the count in the second counter of dual counter 31 increases more quickly reflecting the effect of changes in temperature over time as it relates to shelf life.

LCD modulator 22 is modulated in response to clock signal CLK 1F. Dependent upon the type of LCD, CLK 1F need not have the same frequency as clocks CLK 1A, CLK 1B, CLK 1C and CLK 1D. Modular 22 modulates the LCD as function of both CLK 1F and the output of dual counter 31.

By constructing a time/temperature, shelf life/product integrity indicator, utilizing a first clock which varies at a known rate with respect to time and a second clock which varies at a known rate with respect to temperature, and providing a data table which correlates these clocks with respect to shelf life for a given product, an efficient, easily manufactured, low cost shelf life indicator is provided. Providing a feedback calibrator for calibrating the temperature varying clock with respect to temperature without the requirement for manual adjustment or component alteration, reduces the overall complexity, increases the reliability, and reduces the cost of the indicator. By utilizing a time delayed cycle for controlling individual internal components of the indicator, the time temperature indication may be slowed down so that the value is updated once every few minutes instead of being updated faster than it is possible for a human to comprehend. By providing time temperature correlation circuitry utilizing a data table compensator enabling the influence of temperature with respect to shelf life to be calculated in discrete values at discrete time intervals, any temperature measurement relationship whether non-linear and/or non-exponential may be expressed at numerous discrete measurement points between temperature input and shelf life determination. By utilizing an LCD modulator which can modulate the LCD display modulating the duty cycle, the frequency, or the like, an LCD indicator is provided that can be read both visually and electronically with the ability to present complex information utilizing the modulation of the LCD display.

By providing latched dividers, once the reference gates are removed, the oscillators can also be turned off and the dividers will remember the appropriate calibration while using minimal power, only that power required to power the memory. The device can be restarted at a later date giving the device a longer shelf life and allowing transport and storage with the device without influencing the shelf life indication.

It will thus be seen that the objects set forth above, among those made apparent from the preceding description, are efficiently attained and, since certain changes may be made in the above construction without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A perishable good integrity indicator comprising:
   clock means for outputting a first clock signal which does not substantially vary as a function of temperature;
   second clock means for outputting a second clock signal which varies as a function of temperature;
   counter means for producing a count value as a function of said second clock signal during a determinable time period;
   data means for receiving said count value, translating said count value into a time temperature value representing the relationship of time and temperature during said time period; and
   summing means for summing said time temperature values output by said data means over time and outputting a cumulative time temperature signal.

2. The perishable good integrity indicator of claim 1, further comprising LCD modulator means for receiving said cumulative time temperature signal and outputting a modulation signal for modulating said cumulative time temperature signal capable of modulating an LCD in response thereto.

3. The perishable good integrity indicator of claim 1, wherein said cumulative time temperature value corresponds to a portion of a shelf life for the perishable good.

4. The perishable good integrity indicator of claim 1, further comprising self calibration means for calibrating said second clock signal with respect to temperature and producing a calibrated second clock signal.

5. The perishable good integrity indicator of claim 4, wherein said counter means produces said count value by counting said calibrated second count signal during a time period determined by said first clock signal.

6. The perishable good integrity indicator of claim 1, further comprising clock signal calibration means for calibrating said first clock signal over time and producing a calibrated first clock signal.

7. The perishable good integrity indicator of claim 6, wherein said counter means, data means and summing means each provide an output in response to said calibrated first clock signal.

8. The perishable good integrity-indicator of claim 4, wherein said calibration means includes a divider for receiving said second clock signal and providing a divided clock signal; a reference gate compensated for ambient temperature providing an enabling signal having a time period which varies with temperature; a counter for counting said divided clock signal during said time period and providing a second count value as an output, said divider receiving said second count value and dividing said second clock signal by said second count value to produce said calibrated second clock signal.

9. The perishable good integrity indicator of claim 6, wherein said calibration means includes a divider for receiving said second clock signal-and providing a divided clock signal; a temperature compensated reference gate providing an enabling signal having a time period which does not substantially vary with temperature; a counter for counting said divided clock signal during said time period and providing a second count value as an output, said divider receiving said count and dividing said first clock signal by said second count value to produce said calibrated first clock signal.

10. The perishable good integrity indicator of claim 2, wherein said modulation signal modulates at least one of said frequency, amplitude, and duty of said cumulative time temperature signal to input data to be displayed on said LCD.

11. A perishable good integrity indicator comprising:
    clock means for outputting a first clock signal which does not substantially vary in response to temperature;
    second clock means for outputting a second clock signal which varies as a function of temperature;
    counter means for producing a count value as a function of said second clock signal during a determinable time period;
    data means for receiving said count value, translating said count value into a time temperature value representing the relationship of time and temperature during said time period; and
    summing means including a first counter for counting to a predetermined number as a function of said first clock signal and a second counter counting each occurrence of said first counter counting to said predetermined number outputting a cumulative time temperature value in response thereto; said first counter beginning its count at a value determined by said time temperature signal.

12. The perishable good integrity indicator of claim 11, further comprising LCD modulator means for receiving said cumulative time temperature signal and outputting a modulation signal for modulating said cumulative time temperature signal capable of modulating an LCD in response thereto.

13. The perishable good integrity indicator of claim 11, wherein said cumulative time temperature value corresponds to a portion of a shelf life for the perishable good.

14. The perishable good integrity indicator of claim 11, further comprising self calibration means for calibrating said second clock signal with respect to temperature and producing a calibrated second clock signal.

15. The perishable good integrity indicator of claim 11, wherein said counter means produces said count value by counting said calibrated second count signal during a time period determined by said first clock signal.

16. The perishable good integrity indicator of claim 11, further comprising clock signal calibration means for calibrating said first clock signal over time and producing a calibrated first clock signal.

17. The perishable good integrity indicator of claim 11, wherein said counter means, data means and summing means each provide an output in response to said calibrated first clock signal.

18. The perishable good integrity indicator of claim 14, wherein said self calibration means includes a divider for receiving said second clock signal and providing a divided clock signal; a reference gate compensated for ambient temperature providing an enabling signal having a time period which varies with temperature; said counter counting said clock signal during said time period and providing a second count value as an output, said divider receiving said second count and dividing said second clock means by said second count value to produce said calibrated second clock signal.

19. The perishable good integrity indicator of claim 11, wherein said first calibration means includes a divider for receiving said second clock signal and providing a divided clock signal; a temperature compensated reference gate providing an enabling signal having a time period which varies with temperature; said counter counting said clock signal during said time period and providing a second count value as an output, said divider receiving said second count value and dividing said second clock means by said second count value to produce said calibrated first clock signal.

20. The perishable good integrity indicator of claim 12, wherein said modulation signal modulates at least one of said frequency, amplitude, and duty of said cumulative time temperature signal to input data to be displayed on said LCD.

21. An oscillator self calibrator for calibrating an oscillator clock signal comprising a divider for receiving said oscillator clock signal and generating a first divided clock signal; a reference gate providing an enabling signal having a time period; a counter receiving said enabling signal and counting said divided clock signal during said time period and producing a count value as an output, said divider receiving said count value and dividing said oscillator clock signal by said count value to produce a calibrated clock signal.

22. An oscillator self calibrator for calibrating an oscillator clock signal comprising a divider for receiving said oscillator clock signal and generating a first divided clock signal; a reference gate providing an enabling signal having a time period; a counter for counting said clock signal during said time period and producing a count value as an output, said divider receiving said count value and dividing said clock signal by said count value to produce a calibrated clock signal, said oscillator clock signal not varying as a function of temperature and said reference gate outputting an enabling signal for a time period which does not substantially vary with temperature to calibrate said oscillator clock with respect to time.

23. An oscillator self calibrator for calibrating an oscillator clock signal comprising a divider for receiving said oscillator clock signal and generating a first divided clock signal; a reference gate providing an enabling signal having a time period; a counter for counting said clock signal during said time period and producing a count value as an output, said divider receiving said count value and dividing said clock signal by said count value to produce a calibrated clock signal, said oscillator clock signal having a frequency which varies as a function of temperature and said reference gate providing an enabling signal for a time period which varies as a function of temperature to calibrate said clock signal with respect to temperature.

* * * * *